Oct. 8, 1929.  C. D. STARR  1,731,226
COOKING APPARATUS
Filed Oct. 1, 1927   2 Sheets-Sheet 1

Inventor:
Clarence D. Starr:
by Emery Booth Janney & Varney
Attys

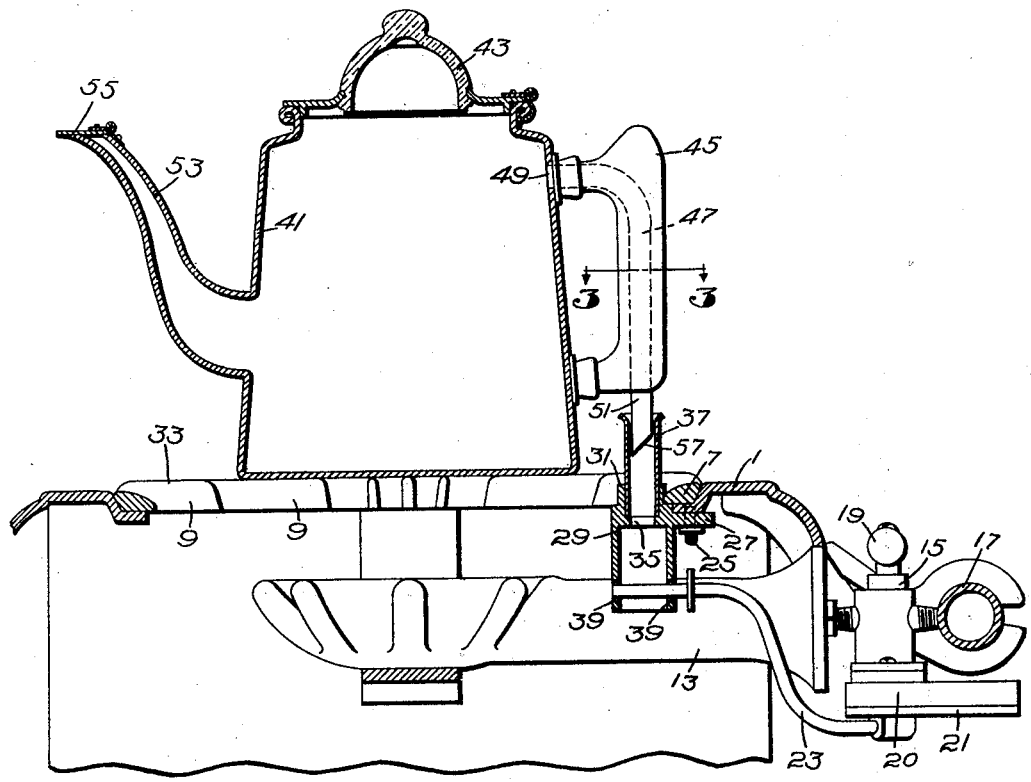
Fig. 2.
Fig. 3.
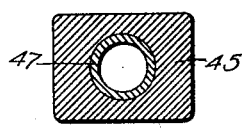
Inventor:
Clarence D. Starr

Patented Oct. 8, 1929

1,731,226

UNITED STATES PATENT OFFICE

CLARENCE D. STARR, OF BARRINGTON, RHODE ISLAND, ASSIGNOR TO BARSTOW STOVE COMPANY, OF PROVIDENCE, RHODE ISLAND, A CORPORATION OF RHODE ISLAND

COOKING APPARATUS

Application filed October 1, 1927. Serial No. 223,361.

My invention relates to cooking apparatus, particularly but not exclusively to domestic ranges using fluid fuel, as for example gas.

The invention, which has among its objects the control of the fuel supply in accordance with conditions in a cooking vessel, will be best understood from the following description when read in the light of the accompanying drawing of one embodiment of the invention, while the scope of the invention will be more particularly pointed out in the appended claims.

In the drawings:—

Fig. 2 is a section on the line 2—2 of Fig. 1 showing a cooking vessel constructed according to the invention above the burner; and Fig. 3 is a section on the line 3—3 of Fig. 2.

Figure 1:
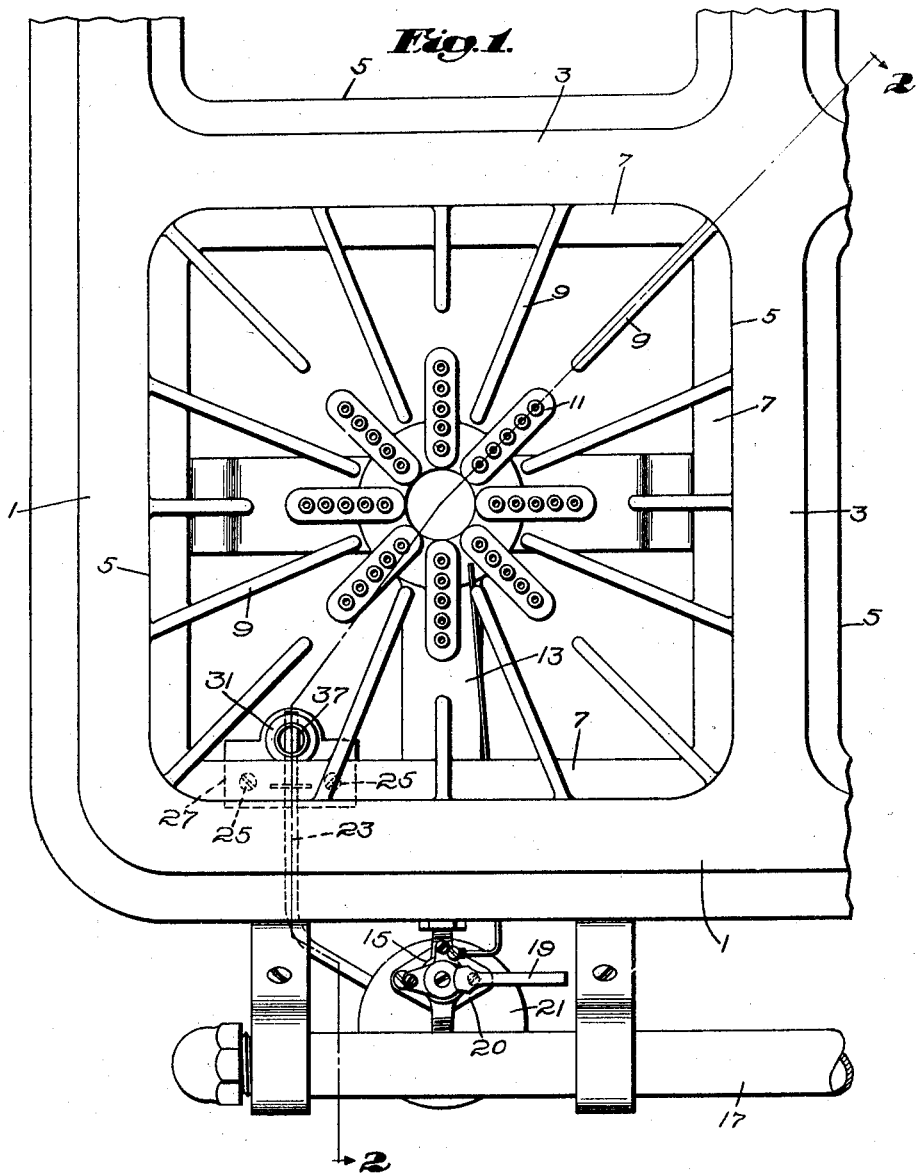
Fig. 1 is a plan of a fragment of the top of a gas range constructed according to the invention.

Referring to the drawings the range illustrated comprises a supporting frame having bar-like front and end members 1 and bar-like longitudinal and transverse members 3 arranged to provide a plurality of openings 5 of generally rectangular shape. As shown carried by said frame and extending over each of said openings are supports for cooking vessels, which supports herein are of common construction, each comprising the side members 7 supporting the radial portions 9 which extend toward a burner 11 carried in the respective opening beneath the supporting member. Herein each burner is connected by a mixing tube 13 and gas cock 15 to a gas manifold 17 for the several burners, said cock having an operating handle 19 for manually establishing, interrupting and regulating the fuel supply to the burner.

As illustrated the gas cock 15 has associated therewith a thermostatically controlled valve in a casing 20, said valve actuated by a diaphragm in an associated diaphragm casing 21. The details of the thermostatically controlled valve do not form part of the present invention, and therefore will not be described with any more particularity than necessary to show how said valve coacts with the present invention. Conveniently however the valve may have a "heat sensitive" tube 23, which, as understood by those skilled in the art, may be filled with liquid, expansion and contraction of which liquid in accordance with the temperature of said tube being effective to actuate the diaphragm for more or less closing and opening the thermostatically controlled valve. As shown the diaphragm casing 21 is situated at that side of the adjacent bar 1 which is opposite the burner so that said diaphragm casing will be relatively unaffected by the heat of the burner.

As shown the front bar-like member 1 has rigidly secured thereto at the side thereof adjacent the burner by means of bolts 25 a bracket 27, said bracket being formed integrally with a vertically extending tube 29 the upper face 31 of which is below the upper faces 33 of the radial members 9 forming the plane of support for the cooking vessel. As shown the tube 29 is formed near its upper end with an interiorly positioned ring or annular shoulder portion 35 which supports the lower end of a removable tube 37, the latter extending to above said plane of support for the cooking vessel and together with the tube 29 forming an elongated tube or flue. As shown the end of the heat sensitive tube 23 extends through radial perforations 39 in the lower end of the tube portion 29 so as to be exposed to the flow through the flue.

The cooking vessel shown herein is of the type known as a "percolator", but obviously the invention is not limited to any particular type of cooking vessel. As shown the vessel is provided with a body 41 having a hinged cover 43, while said body has attached to the side thereof a handle 45 which preferably is of suitable heat insulating material. Extending through the handle is shown a tube 47 which communicates with the interior of the vessel near its top at 49, the lower end of the tube projecting from the handle to form a nipple 51 spaced from the walls of the vessel and adapted to be inserted in the upper end of the tube 37.

Opposite the handle the cooking vessel is shown as provided with a spout 53 having a hinged cover 55 which will permit liquid being poured through the spout, but which will prevent escape of steam and vapors from the spout under normal pressures, thereby causing the steam to escape through the tube 47 and to discharge against the heat sensitive tube. Conveniently the parts may be so constructed and designed as to provide that the thermostatically controlled valve will be substantially wide open until the contents of the vessel reach about the boiling point, whereupon the steam then discharging through the flue against the heat sensitive tube will close the valve sufficiently to prevent violent boiling, with the result that saving of gas is effected and "boiling over" of the vessel is prevented. Opening or removal of the lid from the vessel will cause a current of air to ascend through the flue 29, 27 and tube 47, thereby causing relatively cool air to flow against the heat sensitive element for increasing the flame when the cover is removed.

Preferably means are provided for preventing clogging of the tube 47 with condensation which has the effect of interrupting flow through the tube, particularly downward flow of steam. For this purpose the lower end face 57 of the tube is shown as cut at a relatively sharp angle, which construction I have found will cause effective drainage of all condensation and prevent clogging of said tube.

It will be observed that removal of the tube 37 will result in absence of projections above the plane of support for the cooking vessel, and that under such conditions the heat sensitive tube is subjected to relatively cool air, which results in the thermostatically controlled valve being in open condition, permitting the flow of gas to be controlled by the manually operated handle 19.

The range or heater for the cooking vessel herein claimed is included within the subject matter of applicant's co-pending application Serial No. 315,551, filed October 27, 1928.

Although I have described but one embodiment of the invention it is to be understood that wide deviations may be made from this embodiment without departing from the spirit of the invention.

Claims:

1. A cooking vessel having a generally vertically extending conduit establishing communication between the interior of said vessel at a point adjacent its top and its exterior at a point at the side thereof slightly above its bottom, said conduit terminating at its lower end in a vertically directed portion positioned exteriorly of the vessel in spaced relation to the walls thereof.

2. A cooking vessel having a generally vertically extending conduit establishing communication between the interior of said vessel at a point adjacent its top and its exterior at a point at the side thereof slightly above its bottom, said conduit terminating at its lower end in a vertically directed portion positioned exteriorly of the vessel in spaced relation to the walls thereof, said vertically directed portion of said conduit having an end face at an angle to the axis of said conduit.

3. A cooking vessel having a generally vertically extending conduit establishing communication between the interior of said vessel at a point adjacent its top and its exterior at a point at the side thereof slightly above its bottom, said conduit terminating at its lower end in a vertically directed portion positioned exteriorly of the vessel in spaced relation to the walls thereof, said vertically directed portion of said conduit formed to facilitate discharge of condensation therefrom.

4. A cooking vessel carrying at its exterior a generally vertically extending tube communicating with the interior of said vessel adjacent the top thereof and terminating slightly above the bottom of said vessel, said conduit terminating at its lower end in a vertically directed portion positioned exteriorly of the vessel in spaced relation to the walls thereof, said vessel having a spout provided with a valve preventing escape of vapor therefrom under normal pressures.

5. A cooking vessel having, in combination, a vertically extending handle at the side thereof, conduit means including the interior of said handle establishing communication between the interior of said vessel adjacent the top thereof and a point at the exterior of said vessel slightly above the bottom thereof, said conduit means at its lower end terminating in a nipple below said handle and spaced from the walls of said vessel.

In testimony whereof, I have signed my name to this specification.

CLARENCE D. STARR.